(12) United States Patent
Moriyama et al.

(10) Patent No.: US 8,919,721 B2
(45) Date of Patent: Dec. 30, 2014

(54) SEAT SLIDE APPARATUS FOR VEHICLE

(75) Inventors: Genta Moriyama, Anjo (JP); Tsutomu Oya, Kariya (JP); Toshio Araki, Kariya (JP)

(73) Assignees: Aisin Seiki Kabushiki Kaisha, Kariya-shi (JP); Toyota Shatai Kabushiki Kaisha, Kariya-shi (JP)

( * ) Notice: Subject to any disclaimer, the term of this patent is extended or adjusted under 35 U.S.C. 154(b) by 606 days.

(21) Appl. No.: 13/231,172

(22) Filed: Sep. 13, 2011

(65) Prior Publication Data

US 2012/0061548 A1 Mar. 15, 2012

(30) Foreign Application Priority Data

Sep. 15, 2010 (JP) ................. 2010-206718

(51) Int. Cl.
*F16M 13/00* (2006.01)
*B60N 2/07* (2006.01)
*B60N 2/02* (2006.01)
*B60N 2/08* (2006.01)

(52) U.S. Cl.
CPC ............ *B60N 2/0745* (2013.01); *B60N 2/0292* (2013.01); *B60N 2/074* (2013.01); *B60N 2/0818* (2013.01); *B60N 2/0843* (2013.01)
USPC .......................................... 248/430; 248/429

(58) Field of Classification Search
USPC .......................................... 248/424, 429, 430
See application file for complete search history.

(56) References Cited

U.S. PATENT DOCUMENTS

| 1,716,316 | A | | 6/1929 | Lanning |
| 3,355,211 | A | | 11/1967 | Kölle |
| 5,676,341 | A | * | 10/1997 | Tarusawa et al. ............. 248/430 |
| 6,286,799 | B1 | * | 9/2001 | Fujii ............................. 248/430 |
| 6,923,415 | B2 | * | 8/2005 | Yokoi et al. ................... 248/424 |

(Continued)

FOREIGN PATENT DOCUMENTS

| CN | 101311027 A | 11/2008 |
| CN | 101400543 A | 4/2009 |

(Continued)

OTHER PUBLICATIONS

Extended Search Report issued Mar. 26, 2012 in European Application No. 11181451.3.

(Continued)

*Primary Examiner* — Gwendolyn Baxter
(74) *Attorney, Agent, or Firm* — Oblon, Spivak, McClelland, Maier & Neustadt, L.L.P.

(57) ABSTRACT

A seat slide apparatus for a vehicle includes: a lower rail that is fixed on a vehicle floor; and an upper rail that is fixed to a seat and is movably supported on the lower rail in the front-rear direction of the vehicle, wherein the lower rail has a lower rail hook part, wherein the upper rail has an upper rail hook part, wherein the upper rail hook part is to be engaged with the lower rail hook part in the upper and width directions, wherein the lower rail has a curvature part that is downwards convex as viewed from the width direction of the vehicle, and wherein the lower end of the lower rail hook part at the curvature part has a notch part, in which the downward extending amount is reduced compared to the other part of the lower rail hook part.

11 Claims, 8 Drawing Sheets

(56) References Cited

U.S. PATENT DOCUMENTS

| | | | |
|---|---|---|---|
| 7,147,195 B2* | 12/2006 | Danjo et al. | 248/430 |
| 8,052,113 B2* | 11/2011 | Moriyama et al. | 248/430 |
| 8,469,328 B2* | 6/2013 | Nakamura et al. | 248/430 |
| 8,668,180 B2* | 3/2014 | Shiraki | 248/429 |
| 2008/0290706 A1 | 11/2008 | Yamada et al. | |
| 2009/0060401 A1 | 3/2009 | Rohee et al. | |
| 2009/0224130 A1 | 9/2009 | Becker et al. | |
| 2011/0233365 A1* | 9/2011 | Kato et al. | 248/429 |
| 2012/0061547 A1 | 3/2012 | Moriyama et al. | |

FOREIGN PATENT DOCUMENTS

| | | |
|---|---|---|
| CN | 101524970 A | 9/2009 |
| JP | 2003-63283 | 3/2003 |
| JP | 2008-290625 | 12/2008 |

OTHER PUBLICATIONS

Combined Chinese Office Action and Search Report issued Nov. 29, 2013 in Patent Application No. 201110287200.6 with English Translation.

* cited by examiner

US 8,919,721 B2

SEAT SLIDE APPARATUS FOR VEHICLE

CROSS-REFERENCE TO RELATED APPLICATION

This application claims priority from Japanese Patent Application No. 2010-206718 filed on Sep. 15, 2010, the entire subject matter of which is incorporated herein by reference.

TECHNICAL FILED

The disclosure relates to a seat slide apparatus for a vehicle.

BACKGROUND DISCUSSION

For example, JP2008-290625A discloses a seat slide apparatus for a vehicle. The vehicle is a so-called three-row seat vehicle having a front seat, a second-row seat and a third-row seat, in which a lower rail fixed on a vehicle floor with extending in the front-rear direction of the vehicle is mounted in a range corresponding to normal positions of the second-row and third-row seats. An upper rail, which is fixed to the second-row seat and is configured to move along the lower rail, is provided to move over a wide range (range corresponding to the normal positions of the second-row and third-row seats) in the front-rear direction of the vehicle.

There is a so-called three-row seat vehicle in which the vehicle floor is bent between the normal position of the front seat and the normal position of the second-row seat, and a rear side thereof is inclined,. However, in the related seat slide apparatus for a vehicle, a planar vehicle floor is generally assumed, so that the lower rail is linearly designed. The design is not corresponding to the bending (inclination) of the vehicle floor, and a problem, which occurs when the lower rail including the bent part is provided, is not considered at all. In a related seat slide apparatus for a vehicle in which the lower rail is provided to avoid the bent part, a problem occurs in that the degree of moving freedom of the front seat in the front-rear direction is to be limited.

A need thus exists for a seat slide apparatus for a vehicle which is not susceptible to the drawback mentioned above.

SUMMARY

A seat slide apparatus for a vehicle comprising: a lower rail that is fixed on a vehicle floor and extends in a front-rear direction of a vehicle; and an upper rail that is fixed to a seat and is movably supported on the lower rail in the front-rear direction of the vehicle. The lower rail has a lower rail hook part extending in a width direction of the vehicle, and an end of the lower rail hook part extends more downwards. The upper rail has an upper rail hook part extending in the width direction of the vehicle, and an end of the upper rail hook part extends more upwards. The upper rail hook part is to be engaged with the lower rail hook part in the upper and width directions. The upper rail has a pair of rolling members, which allow the upper rail to move relatively to the lower rail in the front-rear direction with keeping a constant space with the lower rail in the upper-lower direction, and which are arranged in the front-rear direction of the upper rail. The lower rail has a curvature part that is downwards convex as viewed from the width direction of the vehicle, and the lower end of the lower rail hook part at the curvature part has a notch part, in which the downward extending amount is reduced compared to the other part of the lower rail hook part.

According to an aspect of the disclosure, it can be provided that a seat slide apparatus for a vehicle, in which a lower rail including a bent part of a vehicle floor is provided to improve the degree of moving freedom of a seat.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Figure 1:
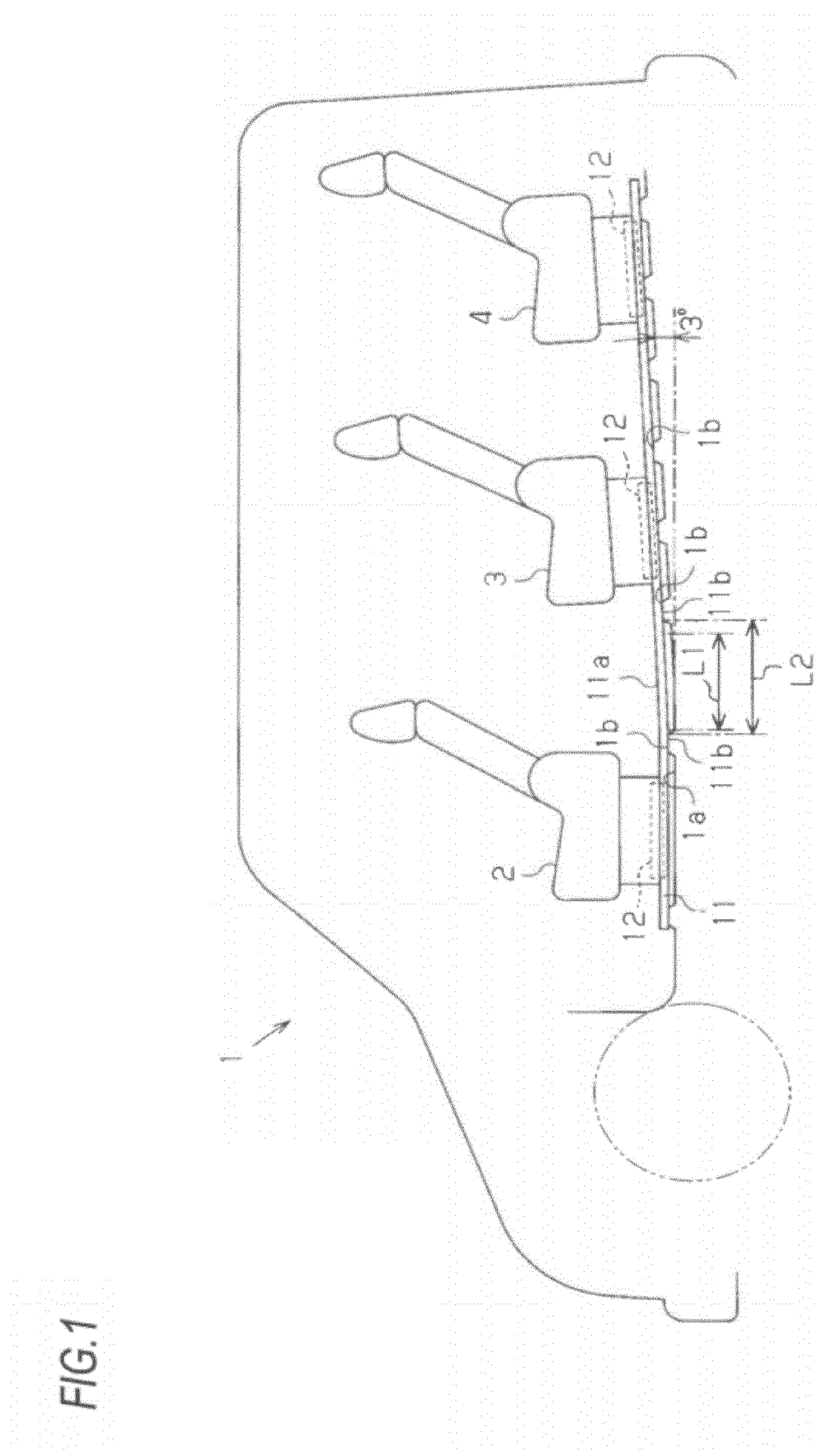
FIG. 1 is a schematic side view illustrating a vehicle and seats according to an illustrative embodiment.

An illustrative embodiment will be explained with reference to the attached drawings.

A seat slide apparatus for a vehicle comprising: a lower rail that is fixed on a vehicle floor and extends in a front-rear direction of a vehicle; and an upper rail that is fixed to a seat and is movably supported on the lower rail in the front-rear direction of the vehicle. The lower rail has a lower rail hook part extending in a width direction of the vehicle, and an end of the lower rail hook part extends more downwards. The upper rail has an upper rail hook part extending in the width direction of the vehicle, and an end of the upper rail hook part extends more upwards. The upper rail hook part is to be engaged with the lower rail hook part in the upper and width directions. The upper rail has a pair of rolling members, which allow the upper rail to move relatively to the lower rail in the front-rear direction with keeping a constant space with the lower rail in the upper-lower direction, and which are arranged in the front-rear direction of the upper rail. The lower rail has a curvature part that is downwards convex as viewed from the width direction of the vehicle, and the lower end of the lower rail hook part at the curvature part has a notch part, in which the downward extending amount is reduced compared to the other part of the lower rail hook part.

According to the above illustrative configuration, the lower rail has the curvature part. Thus, even if a vehicle floor is bent at a central part in the front-rear direction of the vehicle, it is possible to extend the lower rail including the central part. Therefore, it is possible to improve the degree of moving freedom of the upper rail and the seat supported by the upper rail in the front-rear direction.

Also, the end of the lower rail hook part, which is located at the position corresponding to the curvature part convex downwards, is formed as the notch part to reduce the downward extending amount of the lower rail hook part, compared to the other part of the lower rail hook part. Accordingly, when the upper rail passes through the curvature part, it is possible to prevent the upper rail hook part between the rolling members from contacting the end of the lower rail hook part in the upper-lower direction. Specifically, it is preferable that the lower rail hook part extends downwards as much as possible to prevent the upper rail hook part from being separated (the release of the engaged state). However, in a configuration where the notch part is not provided, if the lower rail hook part extends downwards as much as possible on the assumption that the lower rail is not provided with the curvature part, when the upper rail passes through the curvature part, the upper rail hook part between the rolling members may be contacted to the end of the lower rail hook part in the upper-lower direction,. On the contrary, with considering the curvature part, if the entire end (lower end) of the lower rail hook part is set so as to prevent the contact, a gap between the upper rail hook part and the lower rail hook part in the upper-lower direction is increased at a position except for the curvature part. However, according to the above configuration in which the notch part is formed, the end of the lower rail hook part extends downwards as much as possible at a position except for the curvature part, so that it is possible to prevent the upper rail hook part from contacting the end of the lower rail hook part in the upper-rear direction at the curvature part while strongly preventing the separation of the upper rail hook part. Accordingly, the smooth moving in the front-rear direction can be secured.

In addition to the configuration of the above seat slide apparatus for the vehicle, the notch part may be notched upwards by a predetermined amount at all positions of the notched part in the front-rear direction.

According to the above configuration, the notch part is upwards notched by a predetermined amount at all positions of the notched part in the front-rear direction. Accordingly, when forming the notch parts by a punching, for example, the formation becomes easy.

In addition to the configuration of the above seat slide apparatus for the vehicle, the curvature part may have a circular arc shape having a center point at an upper as viewed from the width direction of the vehicle. And then, as approaching the central part of the curvature part in the front-rear direction, an amount of notch of the notch portion may become larger.

According to the above configuration, the notch part is more notched upwards as approaching the central part of the curvature part, which has the circular arc shape having a center point at the upper, in the front-rear direction. Hence, it is possible to prevent the upper rail hook part from contacting the end of the lower rail hook part in the upper-lower direction while reducing the notched amount as much as possible. Specifically, as approaching the center of the curvature part, which has the circular arc shape having a center point at the upper side, in the front-rear direction, the upper rail hook part between the pair of rolling members is higher with respect to the lower rail. Therefore, when the notch part is more notched upwards as approaching the central part in the front-rear direction, it is possible to avoid the contact between the upper rail hook part and the lower rail hook part while minimizing the notched amount. Hence, for example, it is possible to keep the rigidity of the lower rail (lower rail hook parts) as high as possible.

In addition to the configuration of the above seat slide apparatus for the vehicle, the lower rail may be formed with a plurality of lock holes in a longitudinal direction thereof, the upper rail may have lock claw that can be inserted into the lock holes and restrain the upper rail from moving relatively to the lower rail in the front-rear direction. And then, the lock holes may be formed at the lower rail with avoiding the notch part.

According to the above configuration, since the lock holes are formed at the lower rail hook part while avoiding the notch part (i.e., the lock holes are formed at the front side from the notch part and at the rear side from the notch part), the upper rail (seat) is not fixed at the position corresponding to the notch part. Accordingly, the upper rail is fixed only at the high rigidity position of the lower rail (lower rail hook part) and it is possible to support the upper rail without the rattling at the fixed state.

In addition to the configuration of the above seat slide apparatus for the vehicle, the vehicle floor may have a plurality of floor fixing parts. The floor fixing parts may be protruded upwards and may be arranged in the front-rear direction. The lower rail may have a plurality of rail fixing parts. The rail fixing parts may be respectively contacted and fixed on upper surfaces of the floor fixing parts may be arranged in the front-rear direction. And then, the curvature part may be formed between the rail fixing parts.

According to the above configuration, since the curvature part is formed between the rail fixing parts that are contacted and fixed on the upper surfaces of the floor fixing parts, it is possible to strongly fix the lower rail on the vehicle floor without the rattling. In other words, if the rail fixing parts are formed at the curvature part, it is difficult to closely contact the rail fixing parts and the upper surfaces of the floor fixing parts, so that the rattling easily occurs. However, according to the above configuration, it is possible to strongly fix the lower rail on the vehicle floor with avoiding the rattling.

In addition to the configuration of the above seat slide apparatus for the vehicle, three upper rails fixed to respective seats may be supported on the lower rail.

According to the above configuration, the three upper rails, which are respectively fixed to the seats, are supported on the lower rail. Accordingly, in the three-row seat vehicle having a front seat, a second-row seat and a third-row seat, it is possible to improve the degree of moving freedom of the respective seats in the front-rear direction. Also, compared to a configuration in which the lower rail for the front seat and the lower rails for the second-row seat and the third-row seat are separately provided, it is possible to reduce the number of parts.

In addition to the configuration of the above seat slide apparatus for the vehicle, wherein the lower rail may have: a bottom wall part; sidewall parts standing from both ends of the bottom wall part in the width direction of the vehicle; and the lower rail hook parts formed at upper ends of both sidewall parts. The upper rail may have a main body wall part that is arranged between the lower rail hook parts and the upper rail hook parts that are respectively formed at both sides of a lower end of the main body wall part in the width direction.

According to the above configuration, the lower rail has the pair of lower rail hook parts in the width direction of the vehicle and the upper rail has the pair of upper rail hook parts in the width direction of the vehicle in correspondence to the lower rail hook parts. Accordingly, it is possible to strongly support (engage) the upper rail on the lower rail.

In addition to the configuration of the above seat slide apparatus for the vehicle, the seat slide apparatus may comprises: a shoe, which has slidingly contacts a lower surface of the lower rail hook part by own elastic force so as to suppress the upper rail from rattling upwards with respect to the lower rail.

In addition to the configuration of the above seat slide apparatus for the vehicle, the shoe may be provided in a pair in the front-rear direction of the vehicle, and each of the shoes may be respectively arranged at inner sides of the pair of rolling members in the front-rear direction of the vehicle.

In addition to the configuration of the above seat slide apparatus for the vehicle, the lower rail hook part may have a pair of inner extension portions extending toward an inner side in the width direction of the vehicle, wherein each of the pair of the inner extension portions extends opposite each other; and a downward extension portion extending downwards from an end of the inner extension portion.

In addition to the configuration of the above seat slide apparatus for the vehicle, wherein the lock holes may be formed at the front side of the curvature part and at the rear side of the curvature part.

Hereinafter, an illustrative embodiment of the disclosure will be described with reference to the FIGS. 1 to 7.

FIG. 1 is a schematic side view illustrating a vehicle 1. Three seats 2 to 4 (configured by front seat 2 of an assistant driver side, second-row seat 3 and third-row seat 4) provided to the vehicle 1. As shown in FIG. 1, a metal lower rail 11 extending in the front-rear direction of the vehicle is fixed on a vehicle floor 1a. Metal upper rails 12, which are respectively fixed to the seats 2 to 4, are supported on the lower rail 11 to allow the movement in the front-rear direction of the vehicle. In the meantime, the lower rails 11 and the upper rails 12, which configure a part of a seat slide apparatus for a vehicle, are provided in a pair, each of which is the substantially same, in a width direction (a direction orthogonal to the sheet in FIG. 1) of the seats 2 to 4. In the below, one of the rails (the fore rails in FIG. 1) is respectively shown and will be described.

Figure 2:
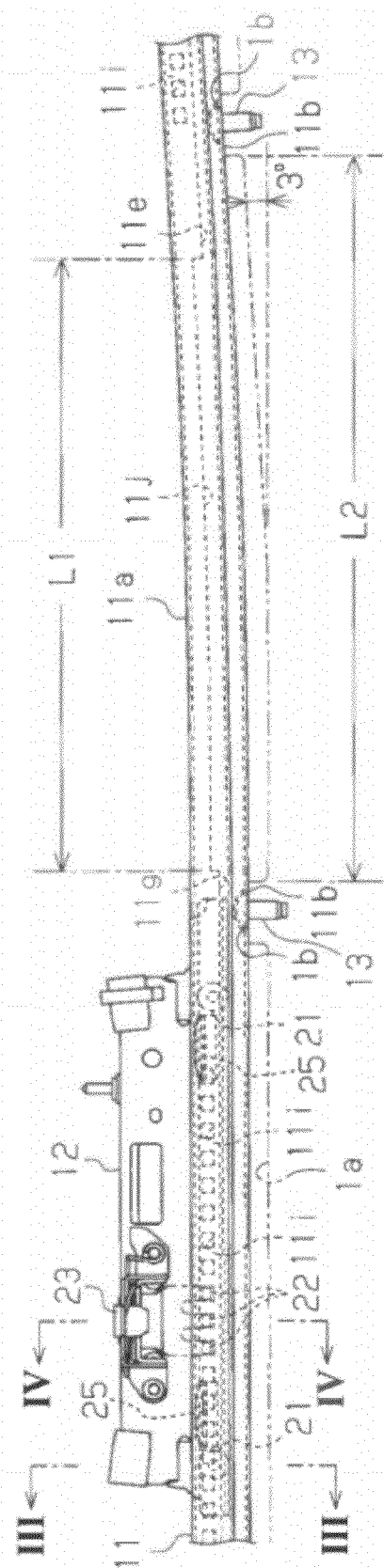
FIG. 2 is a side view illustrating a seat slide apparatus for a vehicle according to an illustrative embodiment.

As shown in FIGS. 1 and 2, the vehicle floor 1a of this illustrative embodiment is bent between a normal position of the front seat 2 and a normal position of the second-row seat 3 at a central part in the front-rear direction of the vehicle, and is inclined rearwards. Incidentally, the normal position is a position at which each of the seats 2 to 4 are apart from each other so that each of passengers can effortlessly sit on the each of sheets, as shown in FIG. 1. In this illustrative embodiment, the vehicle floor 1a is configured so that a rear side of the bent part is inclined by three degrees with respect to the horizontal front side. Also, the vehicle floor 1a has a plurality of floor fixing parts 1b, which are protruded upwards, and which are arranged in the front-rear direction. The floor fixing part 1b has a planar upper surface and a fixing hole (not shown) that is formed at a center of the upper surface.

The lower rail 11 has a curvature part 11a, which is convex downwards as viewed from a width direction of the vehicle, at a position corresponding to the bent position of the vehicle floor 1a. Specifically, the curvature part 11a has a circular arc shape having a center point at the upper side. In this illustrative embodiment, the curvature part 11a has a circular arc shape having a radius of about 7000 mm and having a length of 367 mm (L1 in FIGS. 1 and 2) over the lower rail 11 in the front-rear direction. Also, as shown in FIGS. 1 and 2, the curvature part 11a is formed between a plurality of rail fixing parts 11b that is contacted and fixed on upper surfaces of the floor fixing parts 1b. In this illustrative embodiment, the lower fixing part 11b having a hole (not shown) at a center is fastened to the floor fixing part 1b by a screw 13 (refer to FIG. 2) penetrating the hole and the fixing hole of the floor fixing part 1b. In this illustrative embodiment, a length between the rail fixing parts 11b corresponding to the curvature part 11a is about 400 mm (L2 in FIGS. 1 and 2), and the curvature part 11a (having the length of 367 mm (L1 in FIGS. 1 and 2)) is formed within the range between the rail fixing parts 11b.

Figure 3:
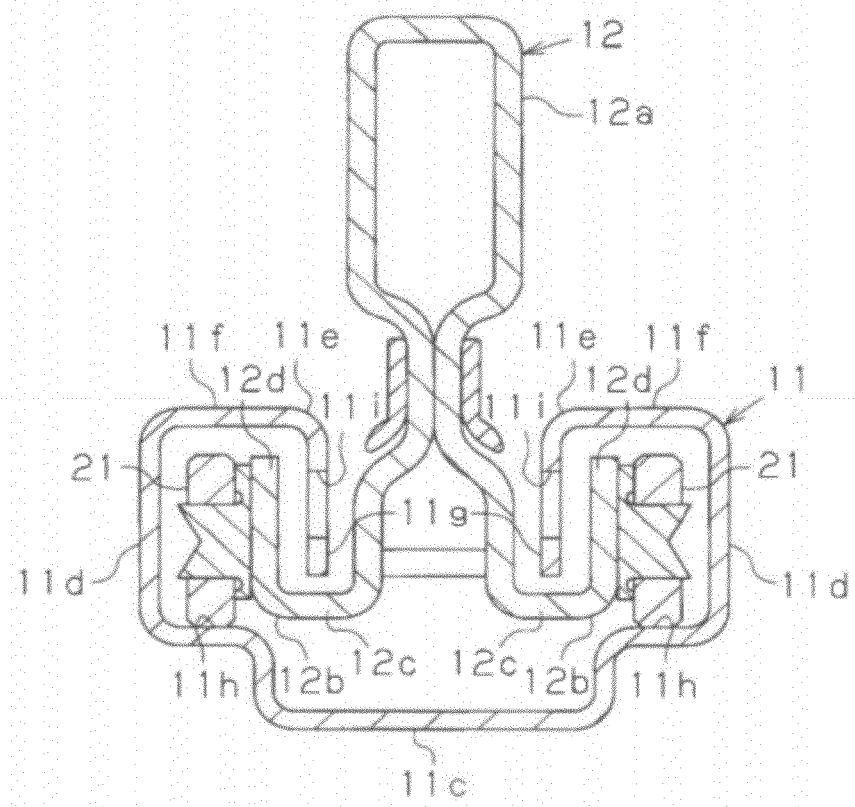
FIG. 3 is a sectional view taken along a line III-III of FIG. 2.

As shown in FIG. 3, the lower rail 11 has a bottom wall part 11c extending in the front-rear direction of the vehicle, sidewall parts 11d standing from both end portions of the bottom wall part 11c in the width direction of the vehicle, and lower rail hook parts 11e formed at upper ends of the sidewall parts 11d. The two lower rail hook parts 11e have, respectively, an inner extension portion 11f and a downward extension portion 11g. The inner extension portion 11f extends toward an inner side in the width direction of the vehicle (opposite direction). The downward extension portion 11g extends downwards from an end of the inner extension portion 11f. Also, in this illustrative embodiment, both end portions of the bottom wall part 11c in the width direction of the vehicle have steps, so that both end portions thereof is configured as traveling rail portions 11h arranged at more upward positions than a center portion of the bottom wall part. In addition, the downward extension portion 11g of the lower rail hook part 11e is formed with a plurality of lock holes 11i (refer to FIGS. 2 to 4) having a substantially rectangular shape, with a predetermined interval in a longitudinal direction (front-rear direction of the vehicle).

As shown in FIG. 3, the upper rail 12 has a pair of main body wall parts 12a and upper rail hook parts 12b. The each of the main body wall parts 12a faces in the width direction of the vehicle and are disposed between the pair of lower rail hook parts 11e. Upper ends of main body wall parts 12a are connected to each other. The upper rail hook parts 12b are formed at outer sides of lower ends of the main body wall parts 12a in the width direction. The upper rail hook parts 12b have, respectively, an outer extension portion 12c and an upward extension portion 12d. The outer extension portion 12c extends toward an outer side (to be spaced from each other) in the width direction of the vehicle. The upward extension portion 12d extends upwards from an end of the outer extension part 12c. The outer extension portion 12c is disposed below the downward extension portion 11g (with a slight gap), so that the upward extension portions 12d face the downward extension portion 11g in the width direction. As a result, the upper rail hook part 12b is allowed to engage to the lower rail hook part 11e in the upward and width directions and is prevented from separating from the lower rail hook part 11e.

Figure 5:
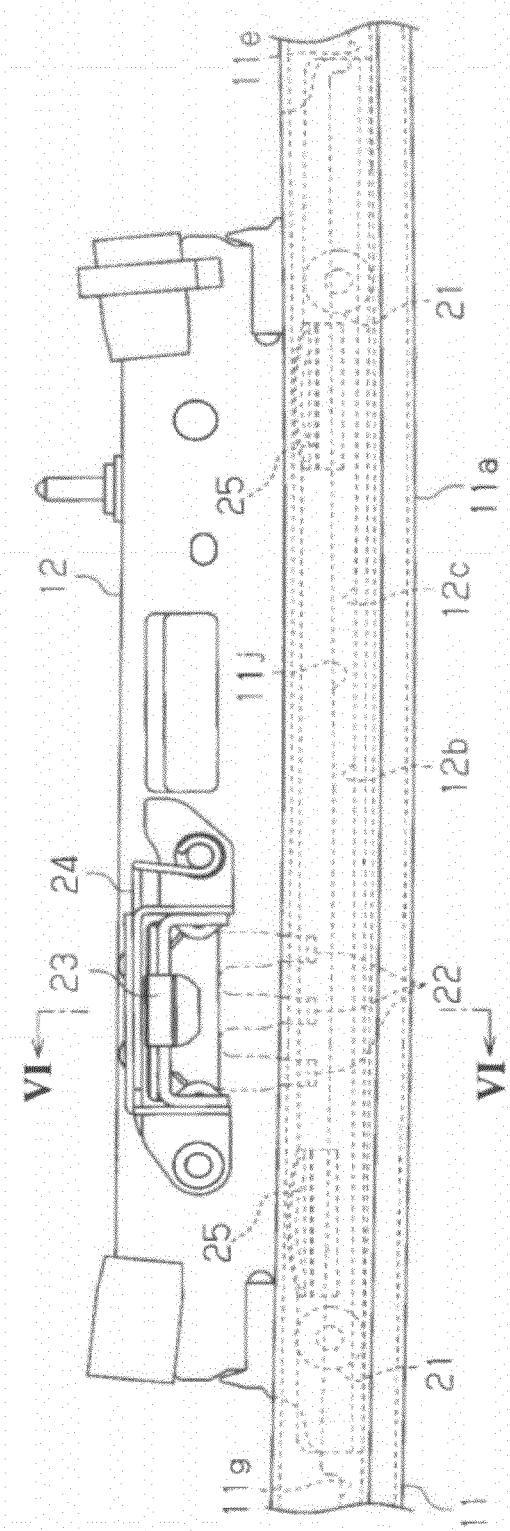
FIG. 5 is a side view illustrating a seat slide apparatus for a vehicle according to an illustrative embodiment.

As shown in FIGS. 2, 3 and 5, the upper rail 12 has a pair of rolling members 21 in the front-rear direction of the upper rail 12. The rolling members 21 allow the upper rail 12 to move forward and rearward with respect to the lower rail 11 with keeping a space with the lower rail 11 in the upper-lower direction. In this illustrative embodiment, as shown in FIG. 3, the rolling members 21 are rotatably supported at the upward extension portions 12d and are rotatable on the traveling rail portions 11h of the lower rail 11, thereby enabling the upper rail 12 to move (travel) in the front-rear direction.

Also, as shown in FIGS. 2, and 5, the upper rail 12 has shoes 25 to suppress the upper rail from rattling with respect to the lower rail 11. As shown in FIGS. 2 and 5, the shoes 25 are arranged at the inner sides of a pair of the rolling members 21 in the front-rear direction of the vehicle. Specifically, the shoes 25 of the illustrative embodiment are provided in a pair in the front-rear direction of the vehicle and are arranged at the inner sides of a pair of the rolling members 21 in the front-rear direction of the vehicle.

Figure 4:
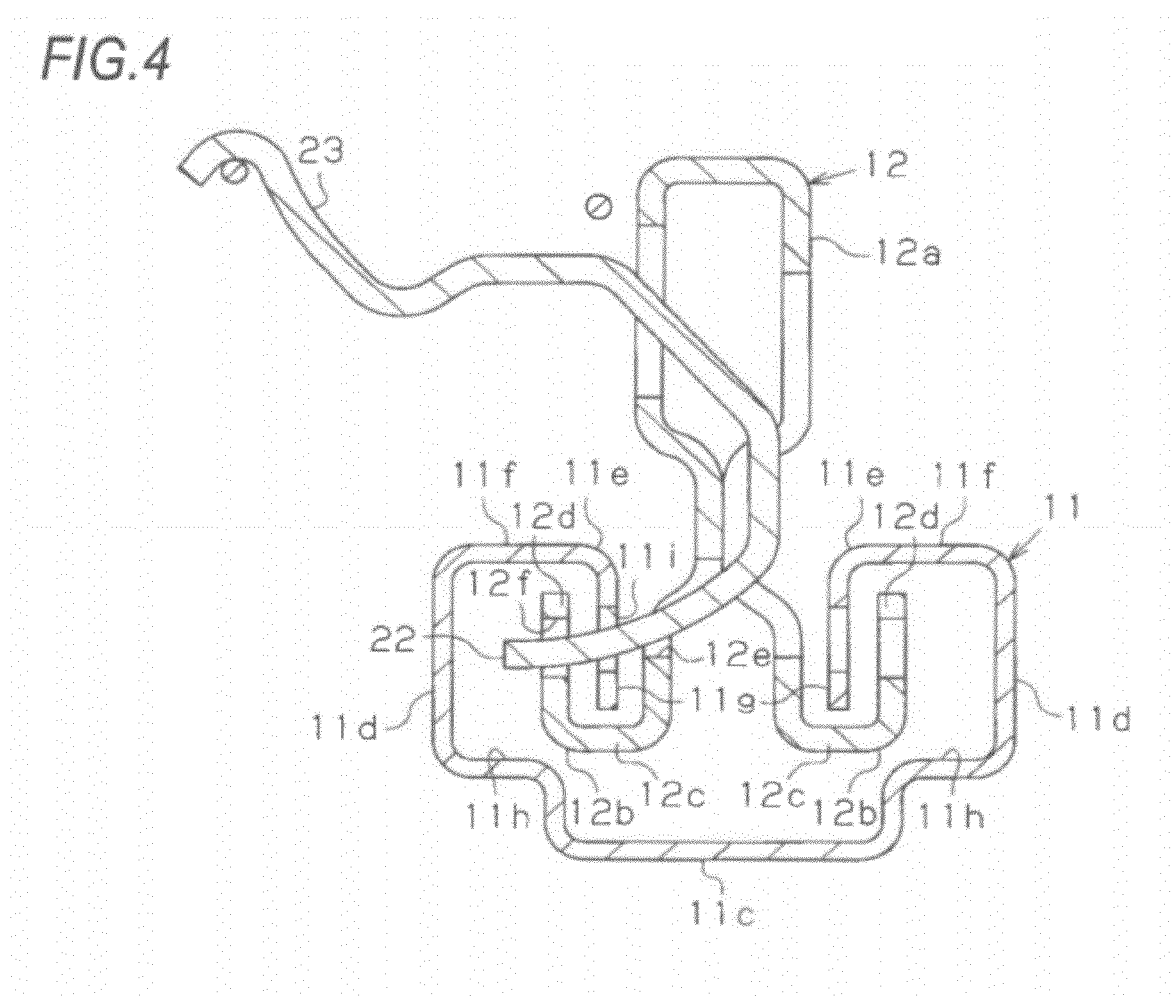
FIG. 4 is a sectional view taken along a line IV-IV of FIG. 2.

As shown in FIGS. 2 and 4, the upper rail 12 has a lock claw 22, which cab be inserted into the lock holes 11i and is allowed to restrain the upper rail 12 from moving with respect to the lower rail 11 in the front-rear direction.

Specifically, as shown in FIG. 4, at the central part of the upper rail 12 in the front-rear direction, the main body wall parts 12a and the upward extension portions 12d are formed with a plurality of penetration holes 12e, 12f, with the predetermined interval (which is the same as that of the lock holes 11*i*) in the longitudinal direction (the front-rear direction of the vehicle).

At positions corresponding to the penetration holes 12*e*, 12*f* of the upper rail 12, a lock lever 23 having the lock claw 22, which can be inserted into the penetration holes 12*e*, 12*f* and the lock holes 11*i*, is rotatably coupled around a rotational axis of the upper rail 12 along the longitudinal direction thereof. As the lock lever 23 is rotated, the lock claw 22 can be inserted into and be separated from the penetration holes 12*f* and the lock holes 11*i*. When the lock claw 22 of the lock lever 23 are inserted into the penetration holes 12*f* and the lock holes 11*i* (refer to FIG. 4), the moving of the upper rail 12 relative to the lower rail 11 is restrained and the seats 2 to 4 supported thereby are positioned. In addition, when the lock lever 23 is rotated and the lock claw 22 are separated from the penetration holes 12*f* and the lock holes 11*i*, the moving of the upper rail 12 (each of the seats 2 to 4) relative to the lower rail 11 is permitted.

In the meantime, by a lock torsion spring 24 (refer to FIG. 5) serving as an urging means, the lock lever 23 is always urged to a direction at which the lock claw 22 are inserted into the penetration holes 12*f* and the lock holes 11*i*, i.e., to a direction at which the moving of the upper rail 12 relative to the lower rail 11 is restrained. Also, when external operation force against the urging force of the lock torsion spring 24 is applied, the lock lever 23 is rotated to a direction at which the lock claw 22 are separated from the penetration holes 12*f* and the lock holes 11*i*, i.e., to a direction at which the moving of the upper rail 12 relative to the lower rail 11 is permitted.

Figure 6:
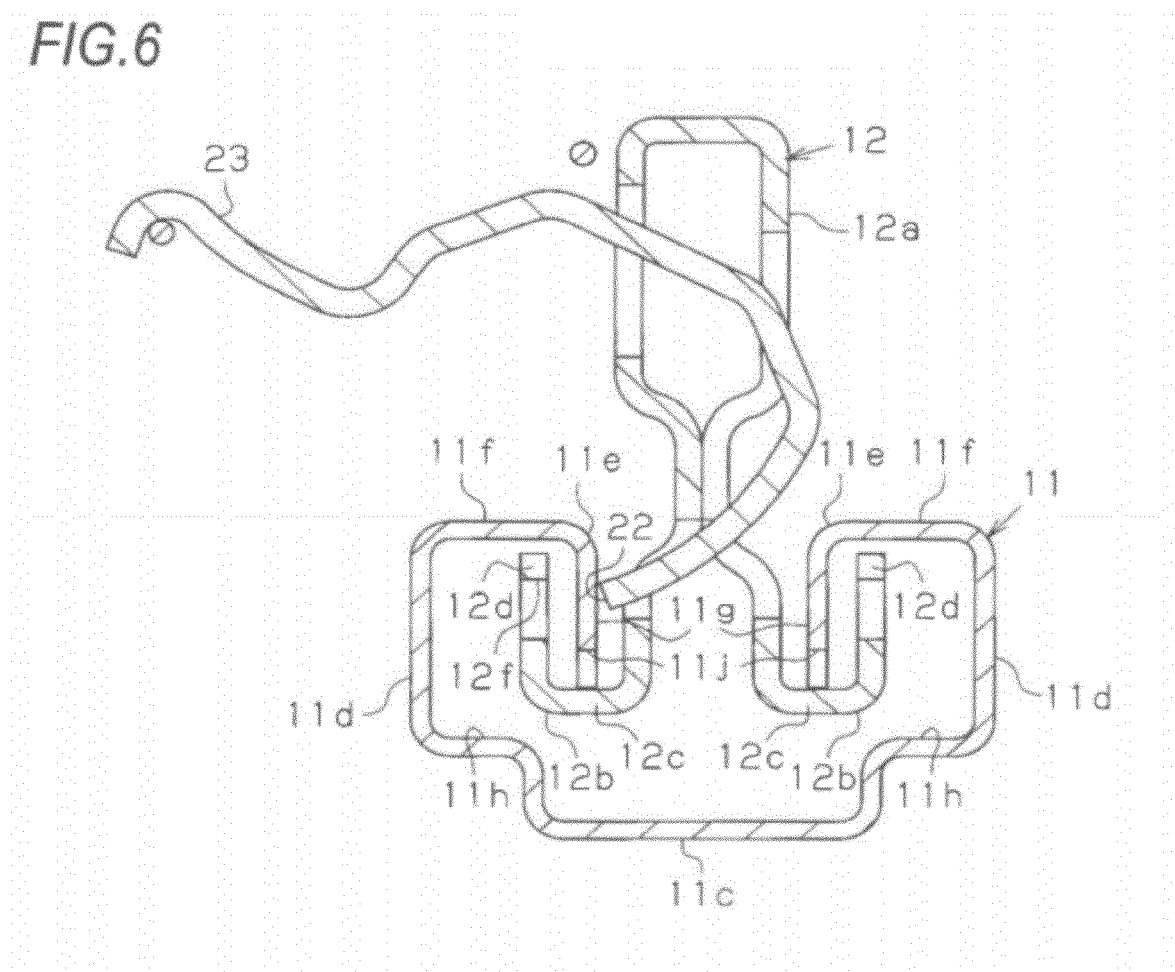
FIG. 6 is a sectional view taken along a line VI-VI of FIG. 5.

In the lower rail 11 of this illustrative embodiment, as shown in FIGS. 2, 5 and 6, an end of the lower rail hook part 11*e* (downward extension portion 11*g*), which is located at a position corresponding to the curvature part 11*a*, is formed as a notch part 11*j* to reduce a downward extending amount of the lower rail hook part 11*e*, compared to the other part of the lower rail hook part 11*e*. Specifically, in this illustrative embodiment, the notch part 11*j* is formed over an entire range corresponding to the curvature part 11*a* in the front-rear direction (i.e., the notch part is formed over the length L1) and is notched upwards by a predetermined amount in the entire range thereof in the front-rear direction. Also, in this illustrative embodiment, as shown in FIG. 2, the lock holes 11*i* are formed at the lower rail hook parts 11*e* with avoiding the notch parts 11*j* (i.e., the lock holes are formed at the front side from the notch parts 11*j* and at the rear side from the notch parts 11*j*).

In the below, the characteristic operational effects of the above illustrative embodiment will be described.

(1) According to the lower rail 11 having the curvature part 11*a*, even if the vehicle has the vehicle floor 1*a* bent at the central part in the front-rear direction of the vehicle, as the above illustrative embodiment, it is possible to extend the lower rail including the central part. Therefore, it is possible to improve the degree of moving freedom of the upper rails 12 and the seats 2 to 4 supported by the upper rails, in the front-rear direction.

The end of the lower rail hook part 11*e*, which is located at the position corresponding to the curvature part 11*a* convex downwards, is formed as the notch part 11*j* to reduce the downward extending amount of the lower rail hook part 11*e*, compared to the other part of the lower rail hook part 11*e*. Accordingly, when the upper rail 12 passes through the curvature part 11*a*, it is possible to prevent the upper rail hook parts 12*b* (outer extension portions 12*c*) between the rolling members 21 from contacting the ends (lower ends) of the lower rail hook parts 11*e* (downward extension portions 11*g*) in the upper-lower direction.

Specifically, it is preferable that the lower rail hook parts 11*e* (downward extension portions 11*g*) extend downwards as much as possible to prevent the upper rail hook parts 12*b* from being separated (the release of the engaging state). However, in a configuration where the notch part 11*j* is not provided, if the lower rail hook parts 11*e* extend downwards as much as possible on the assumption that the lower rail 11 is not provided with the curvature part 11*a*, when the upper rail 12 passes through the curvature part 11*a*, the upper rail hook parts 12*b* (outer extension portions 12*c*) between the rolling members 21 may be contacted to the ends (lower ends) of the lower rail hook parts 11*e* in the upper-lower direction. On the contrary, with considering the curvature part 11*a*, if the entire ends (lower ends) of the lower rail hook parts 11*e* (downward extension portions 11*g*) are set so as to prevent the contact, the gap between the upper rail hook parts 12*b* and the lower rail hook parts in the upper-lower direction is increased at positions except for the curvature part 11*a*. However, according to the above configuration in which the notch parts 11*j* are formed, the ends of the lower rail hook parts 11*e* extend downwards as much as possible at positions except for the curvature part 11*a*, so that it is possible to prevent the upper rail hook parts 12*b* (outer extension portions 12*c*) from contacting the ends of the lower rail hook parts 11*e* in the upper-lower direction at the curvature part 11*a*, while strongly preventing the separation of the upper rail hook parts 12*b*. Accordingly, the smooth moving in the front-rear direction can be secured.

(2) The notch parts 11*j* are notched upwards by a predetermined amount at all positions of the notched part in the front-rear direction. Accordingly, when forming the notch parts by a punching, for example, the formation becomes easy.

(3) Since the lock holes 11*i* are formed at the lower rail hook parts 11*e* with avoiding the notch parts 11*j* (i.e., the lock holes are formed at the front side from the notch parts 11*j* and at the rear side from the notch parts 11*j*), the upper rails 12 (seats 2 to 4) are not fixed at the positions corresponding to the notch parts 11*j* (refer to FIG. 6). Thereby, the upper rails 12 (seats 2 to 4) are fixed only at the high rigidity positions of the lower rail 11 (lower rail hook parts 11*e*), and it is possible to support the upper rails 12 without the rattling at the fixed state.

(4) Since the curvature part 11*a* is formed between the rail fixing parts 11*b* that are contacted and fixed on the upper surfaces of the floor fixing parts 1*b*, it is possible to strongly fix the lower rail 11 on the vehicle floor 1*a* without the rattling. Specifically, if the rail fixing parts 11*b* are formed at the curvature part 11*a*, it is difficult to fix the rail fixing parts 11*b* and the upper surfaces of the floor fixing parts 11*b*, so that the rattling easily occurs. However, according to the above illustrative embodiment, it is possible to strongly fix the lower rail 11 on the vehicle floor 1*a* while avoiding the rattling.

Figure 7:
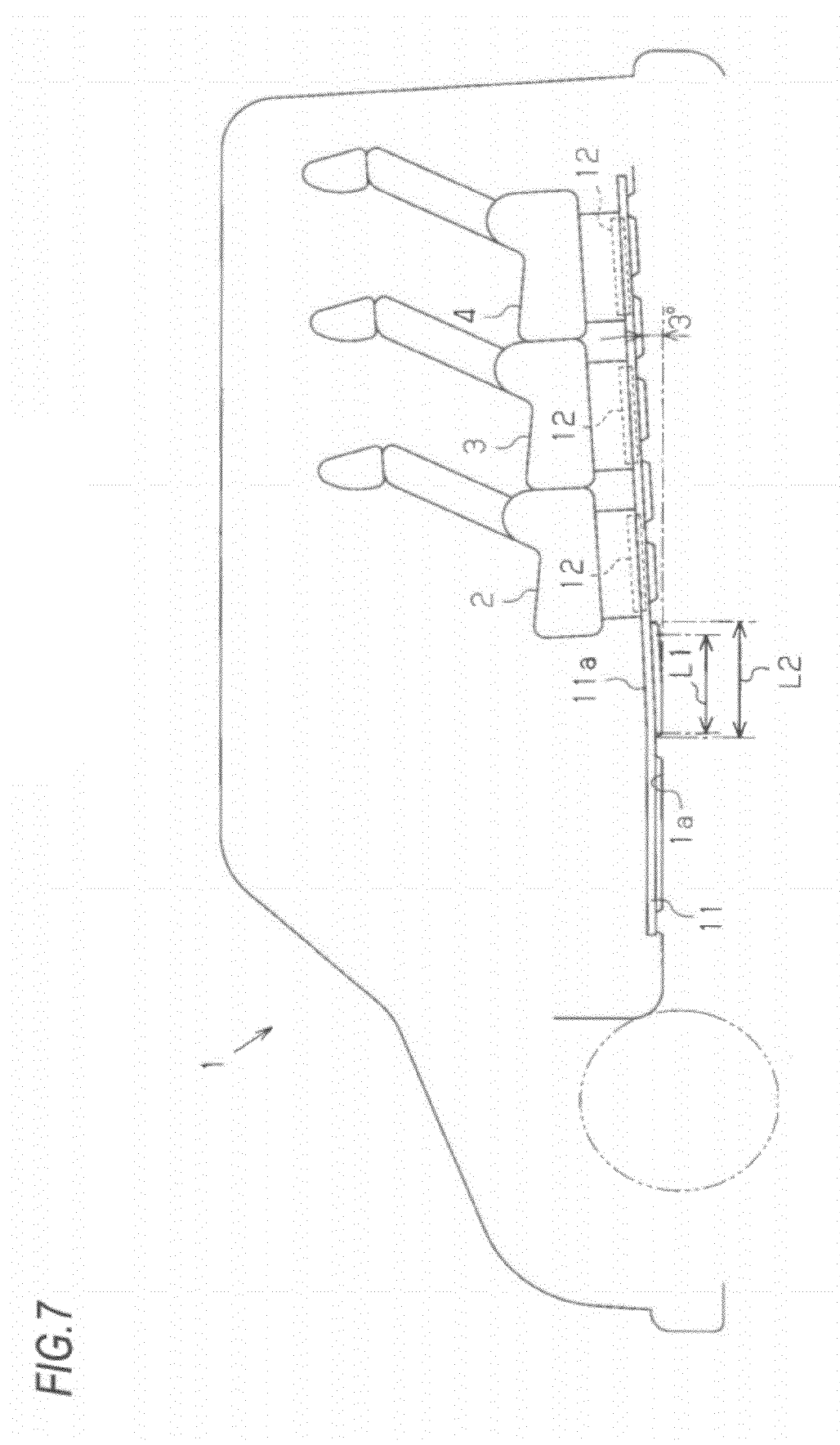
FIG. 7 is a schematic side view illustrating a vehicle and seats according to an illustrative embodiment.

(5) The three upper rails 12, which are respectively fixed to the seats 2 to 4, are supported on the lower rail 11. Accordingly, as the above illustrative embodiment, in the three-row seat vehicle 1 having the front seat 2, the second-row seat 3 and the third-row seat 4, it is possible to improve the degree of moving freedom of the respective seats 2 to 4 in the front-rear direction. Specifically, as shown in FIG. 7, for example, when all the seats 2 to 4 are arranged rearwards to the maximum, it is possible to secure the larger mount space at the position of the assistant driver's seat. Also, compared to a configuration in which the lower rail for the front seat 2 and the lower rails for the second-row seat 3 and the third-row seat 4 are separately provided, it is possible to reduce the number of parts.

(6) The lower rail 11 has the pair of lower rail hook parts 11e in the width direction of the vehicle and the upper rail 12 has the pair of upper rail hook parts 12b in the width direction of the vehicle in correspondence to the lower rail hook parts 11e. Accordingly, it is possible to strongly support (engage) the upper rail 12 on the lower rail 11.

Figure 8:
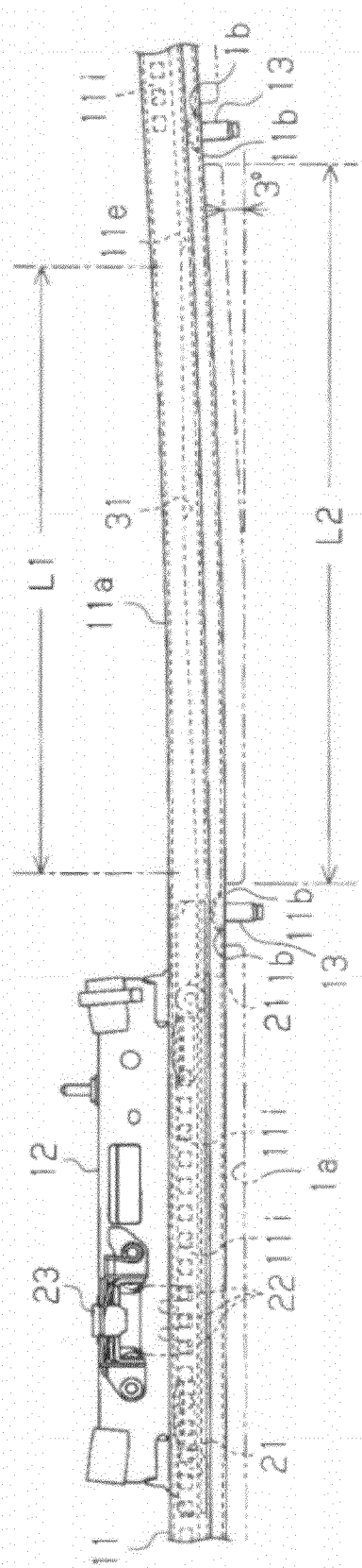
FIG. 8 is a side view illustrating a seat slide apparatus for a vehicle according to another illustrative embodiment.

The above illustrative embodiment may be modified as follows. In the above illustrative embodiment, the notch parts 11j are upwards notched by a predetermined amount at all positions of the notched part in the front-rear direction. However, the disclosure is not limited thereto. For example, as shown in FIG. 8, the above notch part may be modified into a notch part 31 that is more notched upwards as approaching the central part of the curvature part 11a in the front-rear direction. That is, the notch part 31 of this modified embodiment (FIG. 8) is configured so that the notched amount is gradually increased toward the center from both ends in the front-rear direction.

According to the above configuration, it is possible to prevent the upper rail hook parts 12b (refer to FIG. 6) from contacting the ends of the lower rail hook parts 11e in the upper-lower direction while reducing the notched amount as much as possible. Specifically, as approaching the center of the curvature part 11a, which has the circular arc shape having a center point at the upper side as viewed from the width direction, in the front-rear direction, the upper rail hook parts 12b between the pair of rolling members 21 are higher with respect to the lower rail 11. Therefore, when the notch parts 31 are more notched upwards as approaching the central part in the front-rear direction, it is possible to avoid the contact between the upper rail hook parts 12b and the lower rail hook parts 11e while minimizing the notched amount. Hence, for example, it is possible to keep the rigidity of the lower rail 11 (lower rail hook parts 11e) as high as possible.

In the above illustrative embodiment, the notch part 11j is formed over the entire range corresponding to the curvature part 11a in the front-rear direction (i.e., the notch part is formed over the length L1). However, the disclosure is not limited thereto. For example, the notch part may be formed only within a range corresponding to the central part of the curvature part 11a (i.e., the notch part is not formed at parts corresponding to both sides of the curvature part 11a in the front-rear direction). Also, for example, the notch part may be formed over a range which is slightly larger than the range corresponding to the curvature part 11a in the front-rear direction.

In the above illustrative embodiment, the lock holes 11i are formed at the lower rail hook parts 11e with avoiding the notch parts 11j (i.e., the lock holes are formed at the front side from the notch parts 11j and at the rear side from the notch parts 11j). However, the disclosure is not limited thereto. For example, the lock hole may be formed at the lower rail hook part 11e at the position corresponding to the notch part 11j.

In the above illustrative embodiment, the curvature part 11a has the circular arc shape having a radius of about 7000 mm and is formed over a predetermined length 367 mm of the lower rail 11 in the front-rear direction. However, the numerical values may be changed. In the case of changing the values, the numerical values may be preferably changed, based on the inclination angle of the vehicle floor 1a (three degrees in the above illustrative embodiment) and the length between the rail fixing parts 11b corresponding to the curvature part 11a (400 mm in the above illustrative embodiment). In particular, when the curvature part is modified so that it is formed between the rail fixing parts, the same effect as the above (4) can be realized. For example, even when the length between the rail fixing parts 11b corresponding to the curvature part 11a is 350 mm, it is possible to realize the same effect as the above (4) by forming the curvature part 11a over the length 350 mm or smaller of the lower rail 11 in the front-rear direction and between the rail fixing parts 11b.

In the above illustrative embodiment, the lower rail hook part 11e has the inner extension portion 11f extending toward the inner side (opposing side) in the width direction of the vehicle and the downward extension portion 11g extending more downwards from the end of the inner extension portion 11f. However, the shape is not particularly limited thereto. The lower rail hook part extends in the width direction of the vehicle and extends more downwards. For example, the lower rail hook part may be modified into a shape that is entirely curved.

In the above illustrative embodiment, the upper rail hook part 12b has the outer extension portion 12c extending toward the outer side in the width direction of the vehicle (directions getting away from each other) and the upward extension portion 12d extending more upwards from the end of the outer extension portion 12c. However, the shape is not particularly limited thereto The upper rail hook part extends in the width direction of the vehicle and the end thereof extends more upwards. For example, the upper rail hook part may be modified into a shape that is entirely curved.

What is claimed is:

1. A seat slide apparatus for a vehicle comprising:
a lower rail that is fixed on a vehicle floor and extends in a front-rear direction of a vehicle; and
an upper rail that is fixed to a seat and is movably supported on the lower rail in the front-rear direction of the vehicle,
wherein the lower rail has a lower rail hook part extending in a width direction of the vehicle, and an end of the lower rail hook part extends downwardly,
wherein the upper rail has an upper rail hook part extending in the width direction of the vehicle, and an end of the upper rail hook part extends upwardly,
wherein the upper rail hook part is engaged with the lower rail hook part in an upward direction and the width direction of the vehicle,
wherein the upper rail has a pair of rolling members, which allow the upper rail to move relatively to the lower rail in the front-rear direction so as to maintain a constant space with the lower rail in a vertical direction, and which are arranged in the front-rear direction of the vehicle,
wherein the lower rail has a curvature part that is convex downwards as viewed from the width direction of the vehicle, and
wherein the end of the lower rail hook part across a length of the curvature part has a notch in a notch part of the lower rail hook part, in which an amount of downward extension of the end of the lower rail hook part is reduced compared to the other part of the lower rail hook part.

2. The seat slide apparatus for a vehicle according to claim 1, wherein the notch part is notched upwards by a predetermined amount at all positions of the notched part in the front-rear direction.

3. The seat slide apparatus for a vehicle according to claim 1, wherein the curvature part has a circular arc shape having a center point at an upper side thereof as viewed from the width direction of the vehicle, and
wherein, as approaching a center point of the curvature part in the front-rear direction, an amount of the notch of the notch part increases.

4. The seat slide apparatus for the vehicle according to claim 1, wherein the lower rail includes a plurality of lock holes in a longitudinal direction thereof,
   wherein the upper rail has a lock claw for insertion into the lock holes to restrain the upper rail from moving relatively to the lower rail in the front-rear direction, and
   wherein the lock holes are formed on the lower rail outside of the notch part.

5. The seat slide apparatus for a vehicle according to claim 4, wherein the lock holes are formed at a front side from the notch part and at a rear side from the notch part.

6. The seat slide apparatus for the vehicle according to claim 1, wherein the vehicle floor has a plurality of floor fixing parts, which protrude upwards, and which are arranged in the front-rear direction,
   wherein the lower rail has a plurality of rail fixing parts, which respectively contact and are fixed on upper surfaces of the floor fixing parts, and which are arranged in the front-rear direction, and
   wherein the curvature part is formed between the rail fixing parts.

7. The seat slide apparatus for the vehicle according to claim 1, wherein three upper rails fixed to respective seats are supported on the lower rail.

8. The seat slide apparatus for a vehicle according to claim 1, wherein the lower rail has:
   a bottom wall part;
   sidewall parts standing from both ends of the bottom wall part in the width direction of the vehicle; and
   the lower rail hook parts formed at upper ends of both sidewall parts, and
   wherein the upper rail has a main body wall part that is arranged between the lower rail hook parts and the upper rail hook parts that are respectively formed at both sides of a lower end of the main body wall part in the width direction.

9. The seat slide apparatus for a vehicle according to claim 1, further comprising:
   a shoe, which slidingly contacts a lower surface of the lower rail hook part by elastic force so as to suppress the upper rail from rattling upwards with respect to the lower rail.

10. The seat slide apparatus for a vehicle according to claim 9, wherein a plurality of shoes are provided in pairs in the front-rear direction of the vehicle, and
   wherein each of the shoes is respectively arranged at outer sides of the pair of rolling members in the front-rear direction of the vehicle.

11. The seat slide apparatus for the vehicle according to claim 1, wherein the lower rail hook part has:
   a pair of inner extension portions extending toward an inner side in the width direction of the vehicle, wherein each of the pair of the inner extension portions extends opposite each other; and
   a downward extension portion extending downwards from an end of the inner extension portion.

* * * * *